Dec. 29, 1953   J. A. LAWLER   2,664,171
SYSTEM FOR OBTAINING NITROGEN FROM
AIR BY ADSORPTION OF OXYGEN
Filed April 5, 1952
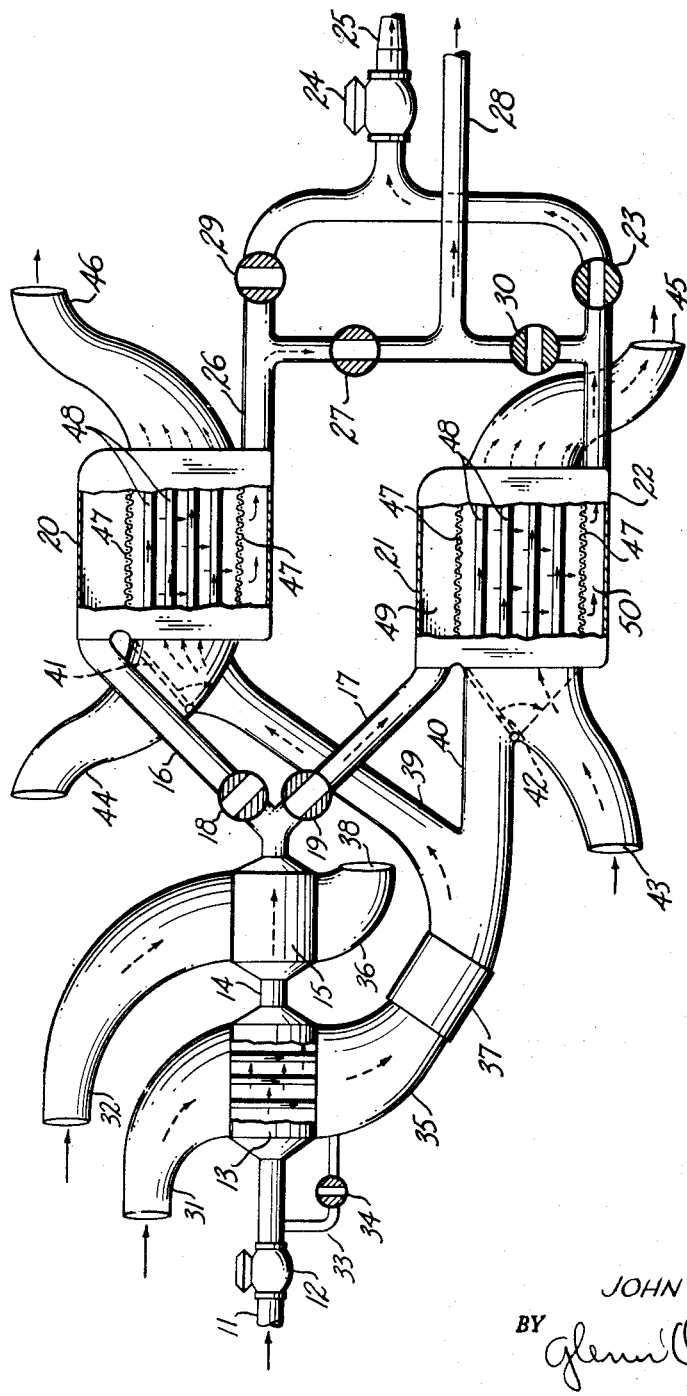
INVENTOR.
JOHN A. LAWLER
BY
Glenn Orlob
AGENT Patented Dec. 29, 1953

2,664,171

UNITED STATES PATENT OFFICE 2,664,171

SYSTEM FOR OBTAINING NITROGEN FROM AIR BY ADSORPTION OF OXYGEN

John A. Lawler, Seattle, Wash., assignor to Boeing Airplane Company, Seattle, Wash., a corporation of Delaware Application April 5, 1952, Serial No. 280,844

1 Claim. (Cl. 183—4.7)

This invention relates to a nitrogen generator operating in an airplane to produce purge gas for injection into fuel tanks and into surrounding cavities, generating the inert purge gas from compressed air by a continuous cycle process utilizing the oxygen adsorption-desorption properties of a powdered compound such as cobalt-chelate and the pressure and temperature energy of both compressed air and ram air.

The purpose of the invention is to provide an airborne inert gas generator that effectively and continuously fills fuel tank vapor spaces and surrounding cavities with non-explosive gas without creating new dangers by its mode of operation.

It is an object of the invention to operate the nitrogen generator at reasonably low temperatures and pressures avoiding combustion of any of the constituents.

It is an object of the invention to produce oxygen that sustains personnel, when necessary.

It is an object of the invention to provide a compact and lightweight nitrogen generator.

This purpose and these objects will be more clearly understood from the following description written with reference to the accompanying schematic sketch of the nitrogen generator.

The invention, in general terms, comprises the unique arrangement of equipment utilizing the available energy resultant from the normal operation of the airplane to establish a continuous flow of inert gas that is produced by the cobalt-chelate absorption of oxygen from cooled compressed air.

Although other compounds may prove to be more suitable, the cobalt-chelate compound is one which has been found satisfactory as the oxygen adsorbing agent. It adsorbs oxygen from a passing air stream under a variety of conditions but more favorable at pressures moderately above atmospheric and at temperatures that are reasonably low. In addition to its adsorption characteristics it is correspondingly suitable for a continuous cycle process by reason of its desorption characteristics. The cobalt-chelate emits the adsorbed oxygen with sufficient rapidity as the temperature is raised and the pressure is lowered.

These properties of cobalt-chelate are exploited by the arrangement and operation of the equipment as schematically illustrated and subsequently described. The equipment is operated by deriving energy primarily from the energy normally available in and around an airplane during flight.

The energy available, however, must be modified before it can be effectively employed in the adsorption-desorption cycle. For example, relatively cool compressed air must be passed over and through the compound during the adsorption phase and at the outset the compressed air available at the engine compressor is hot, necessitating a cooling means. During the subsequent desorption phase warm air serves as a catalyst reducing the time required for the desorption of oxygen and at the outset the air available is cold, necessitating a heating means.

The overall arrangement employs intercoolers to effect this needed modification. Ram air passes through the intercooler as the coolant and withdraws heat from the hot air discharged from the engine compressor. The cooled compressed air thereafter enters a unit where the cobalt-chelate adsorbs the oxygen and during this adsorption, the heat that is generated is removed by additional quantities of ram air passing through cooling tubes. The other by-product of the intercooler, the warmer ram air, is directed into a similar unit through tubes to serve as a heating medium causing the emission of the oxygen previously adsorbed by cobalt-chelate. The two units, one adsorbing oxygen, the other emitting oxygen, are periodically functionally interchanged thereby establishing an over-all substantially continuous process for the production of purge gas.

More particularly, the invention comprises an air intake 11, to receive hot compressed air from a compressor (not shown) or from the compressor of an aircraft turbine or engine (not shown) directing the air through a pressure regulator 12, and into an inter-cooler 13. At the discharge 14 another intercooler 15 further cools the air before it enters the passageways 16 and 17 which are alternately opened and closed by valves 18 and 19 regulating the air flow into the units 20 and 21. The use of the two inter-coolers is optional, for only one would be necessary where conditions do not warrant the greater range of cooling temperatures afforded by employing two inter-coolers.

The directional arrows on the drawing indicate the flow of the cooled air through the valve 19, the passageway 17 and into the unit 21 where oxygen is adsorbed. The inert air, composed primarily of nitrogen, leaves the unit 21 through the pipe 22, valve 23 and pressure regulator 24 for injection into fuel tanks (not shown) through the pipe 25.

While the unit 21 is adsorbing oxygen, a second similar unit 20 is undergoing a desorption process having previously adsorbed oxygen and the emitted oxygen passes through the pipe 26, valve 27 and discharge pipe 28. This arrangement permits the continuous operation of the nitrogen generator by the periodic changing of the respective valves 18, 19; 23, 29; and 27, 30 alternately converting the units 20 and 21 from adsorption units to desorption units.

Atmospheric air collected in wind scoops, noted as ram air, is utilized throughout the system as a cooling and heating medium. Intakes 31 and 32 direct ram air through the respective intercoolers 13 and 15 to cool the compressed air. The heat that is normally absorbed by the cooling air leaving the intercooler 13 is utilized to heat units 20 and 21 during the desorption process. When necessary, this ram air is further heated by introducing hot compressed air through the by-pass 33 and control valve 34 into the discharge passageway 35, and/or by energizing the additional heating element 37.

The heated ram air is directed through the passageways 39 and 40 to the units 20 and 21 at alternate intervals as controlled by the valves 41 and 42.

The ram air leaves the second intercooler 15 through the duct 36 and is discharged into the atmosphere at 38.

When either unit 20 or 21 is functioning as an adsorption unit, ram air is admitted through the respective intakes 43 and 44 to serve as a coolant, leaving through the respective discharges 45 and 46. This flow of ram air is controlled by the valves 41 and 42 which also control the heated ram air, as noted previously.

The units 20 and 21 contain the adsorbing compound between screens 47 and around spaced tubes 48. During the adsorption period the compressed air enters at the top 49 and filters through the compound where oxygen is adsorbed and the purge gas passes on through to the bottom 50, while the coolant, unheated ram air, is passing through the tubes 48. During the desorption period the tubes 48 carry warmed ram air to heat the compound causing the emission of oxygen.

After desorption is complete but before changing back to the adsorption period, compressed air is momentarily admitted to clear the remaining emitted oxygen from the unit by changing the valve 18 to admit compressed air. Shortly thereafter, all the valves are changed to convert the functions of the units 20 and 21 to maintain the continuous production of purge gas.

Where the oxygen is collected and processed for sustaining personnel, the collecting chambers (not shown) must be by-passed during this unit clearing operation, passing the compressed air-oxygen mixture into the atmosphere.

Having now particularly described and ascertained the nature of my invention, and in what manner the same is to be performed, I declare that what I claim is:

A nitrogen-generator system for installation in an airplane to continually generate purge gas during flight for injection into fuel tanks, comprising an engine compressor, a heat exchanger to receive hot compressed air from the engine compressor, a pipe to direct the flow of the air to the exchanger from the discharge of the compressor, an air duct to carry atmospheric air to the heat exchanger as a cooling medium, a Y-sectioned pipe connected to the compressed air outlet of the heat exchanger, valves in each Y-section, two adsorption units to receive compressed air through the respective Y-sections of the second pipe at alternate intervals as controlled by the valves, oxygen adsorbing material contained in each adsorption unit for the substantial removal of oxygen, a pair of additional air ducts to carry atmospheric air through the respective two adsorption units as a cooling medium, a Y-sectioned duct through which the warmed atmospheric air from the heat exchanger passes to the respective adsorption units entering the units at alternate intervals as controlled by valves so that one unit is desorbing oxygen as the other is adsorbing oxygen thereby acquiring an overall substantially continuous production of both purge gas and oxygen, and discharge pipes and valves to segregate and to direct the flow of purge gas and oxygen from the adsorption units respectively to fuel tanks and oxygen receiving chambers.

JOHN A. LAWLER.

References Cited in the file of this patent

UNITED STATES PATENTS

| Number | Name | Date |
|---|---|---|
| 1,548,280 | Ray | Aug. 4, 1925 |
| 2,548,192 | Berg | Apr. 10, 1951 |